US011461632B2

(12) United States Patent
Ling et al.

(10) Patent No.: US 11,461,632 B2
(45) Date of Patent: Oct. 4, 2022

(54) METHOD AND APPARATUS FOR ADAPTING PARAMETERS OF NEURAL NETWORK

(71) Applicant: Nanjing Horizon Robotics Technology Co., Ltd., Nanjing (CN)

(72) Inventors: Kun Ling, Beijing (CN); Liang Chen, Beijing (CN); Jianjun Li, Beijing (CN); Delin Li, Beijing (CN); Chang Huang, Beijing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 1200 days.

(21) Appl. No.: 15/960,119

(22) Filed: Apr. 23, 2018

(65) Prior Publication Data
US 2019/0095790 A1    Mar. 28, 2019

(30) Foreign Application Priority Data
Sep. 25, 2017  (CN) .......................... 201710874198.X

(51) Int. Cl.
*G06N 3/08*   (2006.01)
*G06N 3/063*  (2006.01)
*G06N 3/04*   (2006.01)

(52) U.S. Cl.
CPC ................. *G06N 3/08* (2013.01); *G06N 3/04* (2013.01); *G06N 3/0454* (2013.01); *G06N 3/063* (2013.01)

(58) Field of Classification Search
CPC .......... G06N 3/08; G06N 3/04; G06N 3/0454; G06N 3/063
See application file for complete search history.

(56) References Cited

U.S. PATENT DOCUMENTS

| 4,918,742 A | 4/1990 | Simonds |
| 11,016,742 B2* | 5/2021 | Baker ....................... G06F 9/54 |
| 2005/0157939 A1* | 7/2005 | Arsenault ............... G06T 5/002 |
| | | 382/260 |

(Continued)

FOREIGN PATENT DOCUMENTS

| CN | 106650922 A | 5/2017 |
| CN | 107103113 A | 8/2017 |

(Continued)

OTHER PUBLICATIONS

Motoyama et al., "Optimization for Convolution Calculations in CNN with a Low-Rank Approximation Matrix", IPSJ SIG Technical Report, vol. 2017-HPC-158 No. 25, Mar. 9, 2017 (9 pages).

(Continued)

*Primary Examiner* — Brian M Smith
(74) *Attorney, Agent, or Firm* — Loeb & Loeb LLP

(57) ABSTRACT

Disclosed are a method and an apparatus for adapting parameters of a neural network. The method includes selecting one or more dimensions for a weight parameter of each of at least one layer of the neural network, determining a dimension value and a corresponding target value in each dimension of the weight parameter, and padding the weight parameter in a case where the dimension value in at least one dimension of the weight parameter is less than the corresponding target value, the dimension value in each dimension of the weight parameter after the padding being equal to the corresponding target value.

18 Claims, 6 Drawing Sheets

(56) References Cited

U.S. PATENT DOCUMENTS

| | | | |
|---|---|---|---|
| 2015/0281545 A1* | 10/2015 | Aokage | H04N 5/35581 |
| | | | 348/239 |
| 2017/0344876 A1 | 11/2017 | Brothers | |
| 2017/0344880 A1* | 11/2017 | Nekuii | G06F 17/153 |
| 2018/0089834 A1* | 3/2018 | Spizhevoy | G06T 7/10 |
| 2018/0165577 A1* | 6/2018 | Young | G06N 5/04 |
| 2020/0257930 A1* | 8/2020 | Nahr | G06N 3/063 |
| 2021/0149983 A1* | 5/2021 | Tanaka | G06N 3/063 |

FOREIGN PATENT DOCUMENTS

| | | |
|---|---|---|
| JP | 2013175115 A | 9/2013 |
| KR | 20170135752 | 12/2017 |

OTHER PUBLICATIONS

Chinese First Office Action issued in CN201710874198.X, dated Aug. 14, 2018, 3 pages.
Extended European Search Report for Application No. 18191465.6, dated Feb. 26, 19, 8 pages.

\* cited by examiner

Dimensions of feature data and weight parameter in a convolutional layer

Padded Feature Data
500'

Padding one column with zero values
on the right side

METHOD AND APPARATUS FOR ADAPTING PARAMETERS OF NEURAL NETWORK

CROSS-REFERENCE TO RELATED APPLICATIONS

The present application claims the benefit of, and priority to, a Chinese patent application No. 201710874198.X, entitled "METHOD AND APPARATUS FOR ADAPTING PARAMETERS OF NEURAL NETWORK", filed on Sep. 25, 2017, the disclosure of which is hereby expressly incorporated by reference herein in its entirety.

TECHNICAL FIELD

The present disclosure relates to a method and an apparatus for adapting parameters of an artificial neural network.

BACKGROUND

An artificial neural network (also referred to as a neural network for short) is an algorithm mathematical model for performing distributed parallel information processing by simulating behavior characteristics of a biological neural network. Such a network relies on the complexity of the system, and achieves the purpose of information processing by adjusting interconnections among a large number of internal nodes.

In a common neural network, one or more neurons are linked together and form a multilayered structure. Each neuron in each layer performs calculations with respect to each feature data (also referred to as an input data or a feature map) of the layer by using one or more corresponding weight parameters and based on a specific activation function so as to obtain an activation value as an output result of the neural network or a feature data for the next layer.

For different application scenarios, different neural network architectures are often required to be designed and are required to be implemented by a series of operations on a certain type of computing architecture. Therefore, it is desired that a neural network can be represented efficiently, and that the operations in the neural network can be implemented efficiently with a low hardware cost, or can be mapped in a simulated manner and efficiently onto the operations supported by the computing architecture.

SUMMARY

In one aspect, disclosed is a method for adapting parameters of an neural network, and the method includes selecting one or more dimensions for a weight parameter of each of at least one layer in the neural network, determining a dimension value and a corresponding target value in each dimension of the weight parameter, and padding the weight parameter in at least one dimension in a case where the dimension value in the at least one dimension of the weight parameter is less than the corresponding target value, the dimension value in each dimension of the weight parameter obtained after the padding being equal to the corresponding target value.

In another aspect, disclosed is also an apparatus for adapting parameters of a neural network, and the apparatus includes one or more processors configured to perform the above method.

In another aspect, disclosed is also an apparatus for adapting parameters of an neural network, and the apparatus includes: a detector configured to determine a dimension value and a corresponding target value of a weight parameter of each of at least one layer of the neural network in each of one or more dimensions selected for the weight parameter, and a padder configured to pad the weight parameter in at least one dimension in a case where the dimension value in the at least one dimension of the weight parameter is less than the corresponding target value, the dimension value in each dimension of the weight parameter obtained after the padding being equal to the corresponding target value.

Further, disclosed is also a non-transitory storage medium having program instructions stored thereon for performing the above method.

DETAILED DESCRIPTION

The feature data and/or weight parameters of different layers of a neural network may have different forms and/or quantities based on different application backgrounds and processing targets. Herein, depending on the type of the neural network and a key operation in a layer of the neural network, the weight parameter includes a key parameter associated with the key operation of the layer. For example, for a convolutional layer of a convolutional neural network, the key operation may be a convolution operation, and the weight parameter may include one or more convolution kernels.

Depending on an operation of interest and the types and/or viewpoints of a weight parameter or features of interest, one or more dimensions may be determined or selected for a weight parameter. For example, in a case where a corresponding weight parameter is one or more values, the weight parameter may have at least a dimension of number; in a case where the corresponding weight parameter is one or more one-dimensional data (for example, a one-dimensional array including one or more values), the weight parameter may have at least dimensions of width (for example, the number of data in a one-dimensional array) and number (for example, the number of one-dimensional arrays); in a case where the corresponding weight parameter is one or more two-dimensional data (for example, a matrix), the weight parameter may have at least dimensions of width (for example, the number of columns in the matrix), height (for example, the number of rows in the matrix) and number; and in a case where the corresponding weight parameter is one or more three-dimensional data (for example, a cube), the weight parameter may have at least dimensions of width, height, depth and number. Similarly, the feature data of each layer may also have one or more dimensions (for example, width, height, depth and number). It is to be appreciated that other type and number of dimensions may be considered for the feature data and/or weight parameter of a layer of the neural network according to the requirements, which is not limited by the above examples.

For example, considering the design complexity and cost etc., the hardware for supporting the operations in a neural network (such as dedicated accelerators, accumulators, and wiring arrangements among accumulators) may only be able to directly process parameter weight parameter and/or feature data with a certain form and/or quantity, or may only be able to achieve a relatively good processing performance in a case of weight parameter and/or feature data with a certain form and/or quantity. Therefore, padding the feature data and/or weight parameter to obtain a feature data and/or weight parameters with some regular forms and/or quantities is advantageous for at least simplifying hardware design, saving costs, improving processing efficiency, and the like.

Figure 1:
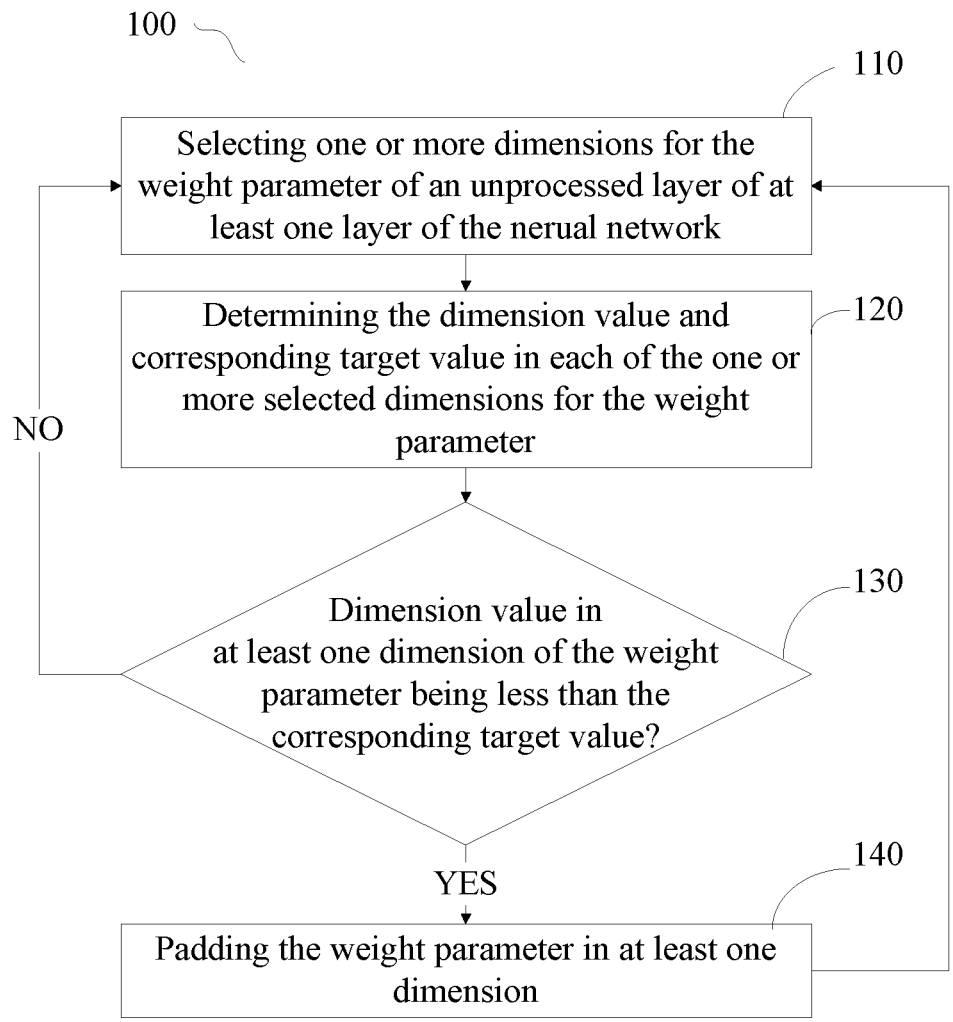
FIG. 1 shows an exemplary method for adapting parameters of a neural network according to an embodiment of the present disclosure.

FIG. 1 shows an exemplary method 100 for adapting parameters of a neural network according to an embodiment of the present disclosure.

As shown in FIG. 1, in a step 110, one or more dimensions are selected for a weight parameter of one unprocessed layer of at least one layer of the neural network.

In a step 120, a dimension value and a corresponding target value of each of the one or more selected dimensions of the weight parameter are determined.

In a step 130, for each dimension, the dimension value and the corresponding target value on the dimension of the weight parameter are compared. In a case where the dimension value on at least one dimension of the weight parameter is less than the corresponding target value, the method 100 proceeds to a step 140. Otherwise, the method 100 returns back to the step 110 to continue to process a weight parameter of the next unprocessed layer.

In the step 140, the weight parameter is padded on each dimension determined based on the comparison result in the step 130, such that the dimension value on each of the one or more selected dimensions of the weight parameter obtained after the padding is equal to the corresponding target value. Then, the method 100 returns back to the step 110 to continue to process the weight parameter of the next unprocessed layer.

The method according to embodiments of the present disclosure is described hereafter with a convolutional neural network as an example. It is to be appreciated that the principles of the present disclosure are not limited to the convolutional neural network, but may be applied to other types of neural networks.

Figure 2:
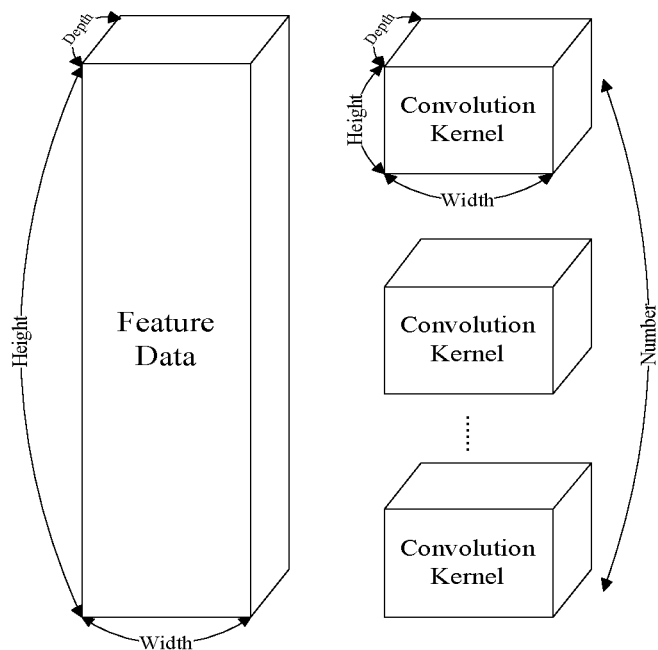
FIG. 2 shows an example of dimensions of a weight parameter and feature data according to an embodiment of the present disclosure.

FIG. 2 shows an example of dimensions of feature data and weight parameter in a convolutional neural network. As shown in FIG. 2, the feature data may have at least dimensions of width, height, depth (or number of channels) and number (not shown). As shown in FIG. 2, the weight parameter may have one or more convolution kernels with the same shape and size, and may have at least dimensions of width (i.e. width of each convolution kernel), height (i.e. height of each convolution kernel), depth (i.e. depth or number of channels of each convolution kernel), and number (i.e. number of convolution kernel).

For the example of the weight parameter shown in FIG. 2, for example, the exemplary method 100 may select one or more of width, height, depth, and number in the step 110 as dimensions to be further processed.

According to one embodiment, for example, the corresponding target values of some or all dimensions of the one or more dimensions selected in the step 110 of the exemplary method 100 may be determined independently.

For example, the hardware circuit supporting multiply-add operation of the neural network may include an arrangement of one or more groups multipliers and adders, and the arrangement of each group of multipliers and adders may include one or more multipliers and one or more adders. Based on the arrangement of each group of multipliers and adders, it is determined that the utilization ratio of the multipliers and adders is the highest (or relatively high) in a case where the depth value of the weight parameter is A, and for example, the design/arrangement of the selection/enabling appliance may be omitted. Then, the target value in depth of the weight parameter may be determined as a multiple of A, wherein the multiple is greater than or equal to the dimension value in depth of the weight parameter. For example, in a case where A=3, for the current neural network, a set of candidate values for the target value in depth of the weight parameter is $\{x|x=n*A,$ n being a positive integer$\}$. In a case where the dimension value in depth of the weight parameter of the current layer is 5, the target value in depth of the weight parameter may be determined to be a value greater than or equal to 5 in the aforementioned set of candidate values, for example, 6, 9, or 12 or the like. For example, the minimum value (i.e., 6) may be selected as the target value from a subset $\{x|x=m*A,$ n being a positive integer greater than or equal to 5$\}$ of the set of candidate values.

In an another example, based on the architectural design of the neural network and/or the design of the hardware supporting the neural network, it is determined that the target value in depth of the weight parameter should be a value in a set of $\{3, 5, 7, 9, 12, 256, 1024, \ldots \}$, where, for example, extra processing may be reduced or the processing performance of hardware may be good in a case where the depth of the weight parameter is a value in the set. Then, the target value in depth of the weight parameter may be determined to be a value in the set which is greater than or equal to 5, for example, 5, 7, 9, 12, 256, 1024, and the like. For example, the minimum value 5 may be selected as the target value from these candidate values. Thus, the dimension value is equal to the target value, and there is no need to pad the weight parameter in depth. In another example, 7 may be selected as the target value, for example. Thus, the dimension value is less than the target value, and therefore, padding the weight parameter in depth is required.

In another example, based on the arrangement of each group of multipliers and adders or the architectural design of the neural network and the like, it is determined that the utilization ratio of the multipliers and adders is the highest (or relatively high) in a case where the number of weight parameters is B, and the design/arrangement of the selection/enabling appliance may be omitted, for example. Then, the target value in number of the weight parameter may be determined as a multiple of B, wherein the multiple is greater than or equal to the dimension value in number of the weight parameter. For example, in a case where B=5, for the current neural network, a set of candidate values for the target value in number of the weight parameter is $\{y|y=n*B,$ n being a positive integer$\}$. In a case where the dimension value in number of the weight parameter of the current layer is 8, the target value in number of the weight parameter may be determined to be a value greater than or equal to 8 in the aforementioned set of candidate values, for example, 10, 15, or 20 or the like. For example, the minimum value 10 may be selected as the target value from a subset $\{y|y=n*B,$ n being a positive integer greater than or equal to 5$\}$ of the set of candidate values.

In another example, the hardware circuit supporting the multiply-add operation of neural network may include an arrangement of one or more groups of multipliers and adders, and the arrangement of each group of multipliers and adders may include one or more multipliers and one or more adders. A first parameter C and a second parameter D may be determined based on the arrangement of each set of multipliers and adders (for example, the number of adders for carrying out the operation of the last addition) and the number of groups. Thus, the set of candidate values for the target value in depth or number of the weight parameter may be determined as a set of common multiples of C and D.

In another example, according to the shapes of the weight parameter, which can be processed directly by the hardware, or according to the architectural design of the neural network etc., it is determined that the target value in width of the weight parameter should be a value in the set $\{3, 5, 6, 7, 9, 11\}$. In a case where the width of the weight parameter of the current layer is 4, the target value in width of the weight parameter may be determined as a value in the subset $\{5, 6, 7, 9, 11\}$ of the aforementioned set. For example, the target value may be determined as the minimum value 5 in the subset.

According to another embodiment, for example, in one or more dimensions selected in the step 110 of the example method 100, the corresponding target values in some or all dimensions may be determined in association with each other.

For example, in a case where a combination of the width and height of a weight parameter that may be processed directly by the hardware is a combination in the set $\{(3,3), (3,6), (4,7), (5,5), (7,7)\}$, the set may be used as a set of a candidate value arrays of the target value in width and height of the weight parameter. In a case where the width and height of the weight parameter of the current layer are 4 and 4, respectively, a candidate value array may be selected from a subset $\{(4,7), (5,5), (7,7)\}$ of the aforementioned example set for determining the corresponding target values of the weight parameter in width and height, wherein the corresponding target values in width and height that may be determined based on each candidate value array in the subset are greater than or equal to the dimension values of the weight parameter in width and height, respectively. For example, width may be selected as a primary reference dimension, and a candidate value array (4, 7) including the minimum width value may be selected from the above subset, based on which the corresponding target values of the weight parameter in width and height may be determined to be 4 and 7, respectively. In another example, a candidate value array (5, 5) with the minimum product of all components in the candidate value array may also be selected from the above subset, wherein 4×7=28, 5×5=25, 7×7=49, and the product of all the components in the candidate value array (5,5) is minimum, based on which the corresponding target values in width and height of the weight parameter are determined as 5 and 5, respectively. This is equivalent to enabling the "area" of the padded weight parameter in two dimensions of both width and height to be minimum and completely "cover" the original weight parameter.

In another example, based on the architectural design of the neural network and/or hardware parameters, the combination of target values of the weight parameter in width, height, and depth is determined to be a combination in the set $\{(3,3,3), (3,6,6), (4,7,6), (5,5,5), (7,7,7)\}$. In a case where the width, height, and depth of the weight parameter of the current layer are 4, 4, and 4, respectively, a candidate value array may be selected from a subset $\{(4,7,6), (5,5,5), (7,7,7)\}$ of the aforementioned example set for determining the corresponding target values in width, height, and depth of the weight parameter, wherein the corresponding target values in width, height, and depth that may be determined based on each candidate value array in the subset are greater than or equal to dimension values in width, height, and depth of the weight parameter, respectively. For example, width may be selected as the primary reference dimension, and an candidate value array (4,7,6) including the minimum width value may be selected from the above subset, based on which the corresponding target values in width, height, and depth of the weight parameter are determined to be 4, 7, and 6, respectively. In another example, an candidate value array (5,5,5) with the minimum product of all components in the candidate value array may also be selected from the above subset, wherein 4×7×6=168, 5×5×5=125, 7×7×7=343, and the product of all the components in the candidate value array (5,5,5) is minimum, based on which the corresponding target values in width, height, and depth of the weight parameter are determined as 5, 5, and 5, respectively. This is equivalent to enable the "volume" of the padded weight parameter in three dimensions of width, height, and depth to be minimum and completely "bound" the original weight parameter.

According to another embodiment, for example, in one or more dimensions selected in the step 110 of the example method 100, the corresponding target values in a part of dimensions may be determined in association with each other, and the corresponding target values in each of the other part of dimensions may be determined independently.

According to an embodiment, the method 100 may further include determining a padding mode corresponding to each dimension of the one or more dimensions selected in the step 110, or each dimension of the at least one dimension determined in the step 130, wherein the determined padding mode indicates at least one of one or more padding positions, padding amounts, and rules for setting padding values for padding the weight parameter in the dimension.

For example, the information indicated by the padding mode corresponding to width includes padding one or more columns at one or more positions on the left side and/or on the right side and/or in the middle in a direction of width. Accordingly, the padding amounts may be the amounts of columns to be padded at the indicated one or more positions, respectively.

For example, the information indicated by the padding mode corresponding to height includes padding one or more rows at one or more positions on the top side and/or on the bottom side and/or in the middle in a direction of height. Accordingly, the padding amounts may be the amounts of rows to be padded at the indicated one or more positions, respectively.

For example, the information indicated by the padding mode corresponding to depth includes padding one or more banks at one or more positions on the front side and/or on the rear side and/or in the middle in a direction of depth. Accordingly, the padding amounts may be the amounts of banks to be padded at the indicated one or more positions, respectively.

For example, the information indicated by the padding mode corresponding to number includes padding with one or more padding values at one or more positions before and/or after and/or in the sequence of the weight parameters. Accordingly, the padding amounts may be the amounts of padding values to be padded at the indicated one or more locations, respectively.

According to one embodiment, the weight parameter may be padded by using zero values. According to various embodiments, rules for setting padding values may also includes, but are not limited to, padding by using predefined non-zero values, padding by using values at positions adjacent to the positions to be padded, and so on.

A zero value herein may refer to a value equal to numerical zero, or an array, a tuple, a matrix, a cube, or the like with the values of all components being zero, or other forms of data values that may be considered as being equivalent to zero. Accordingly, a non-zero value may refer to a value not equal to numerical zero, or an array, a tuple, a matrix, a cube, or the like with the values of some or all components not being zero, or other forms of data values that may not be considered as being equivalent to zero.

According to an embodiment, in a case where the size and shape of the weight parameter of a layer of the neural network change after padding or it can be determined that the size and shape of the weight parameter will change, the method 100 may further include padding the feature data of the layer in a dimension (e.g. width and/or height and/or depth) where the size and shape of the weight parameter change, for example, after padding the weight parameter in the dimension such as width and/or height and/or depth where makes the size and shape of the weight parameter change, or in a case of determining to pad the weight parameter in a dimension such as width and/or height and/or depth where the size and shape of the weight parameter may change. For example, in a case of padding the weight parameter in width, the corresponding feature data may also be padded in width.

In an example, the padding positions and padding amounts in each dimension to be padded for the feature data may be the same as the padding positions and padding amount in corresponding dimension of the weight parameter, respectively. Alternatively, the feature data may be padded by using the padding mode determined for the weight parameter.

According to various embodiments, the rules for setting padding values for the feature data may include, but are not limited to, padding by using zero values, padding by using predefined non-zero values, padding by using values adjacent to the positions to be padded, padding by using random values or arbitrary values, and so on.

It is to be appreciated that the method 100 as shown in FIG. 1 is only exemplary. In another example, the corresponding target value in each dimension may be determined in the step 110, or the determination of the target values may be carried out in a separate step. For example, the optional step of determining the padding mode may be arranged at any stage prior to padding the weight parameter and/or the feature data. For example, padding the feature data and padding the weight parameter may be carried out in parallel.

Figure 3:
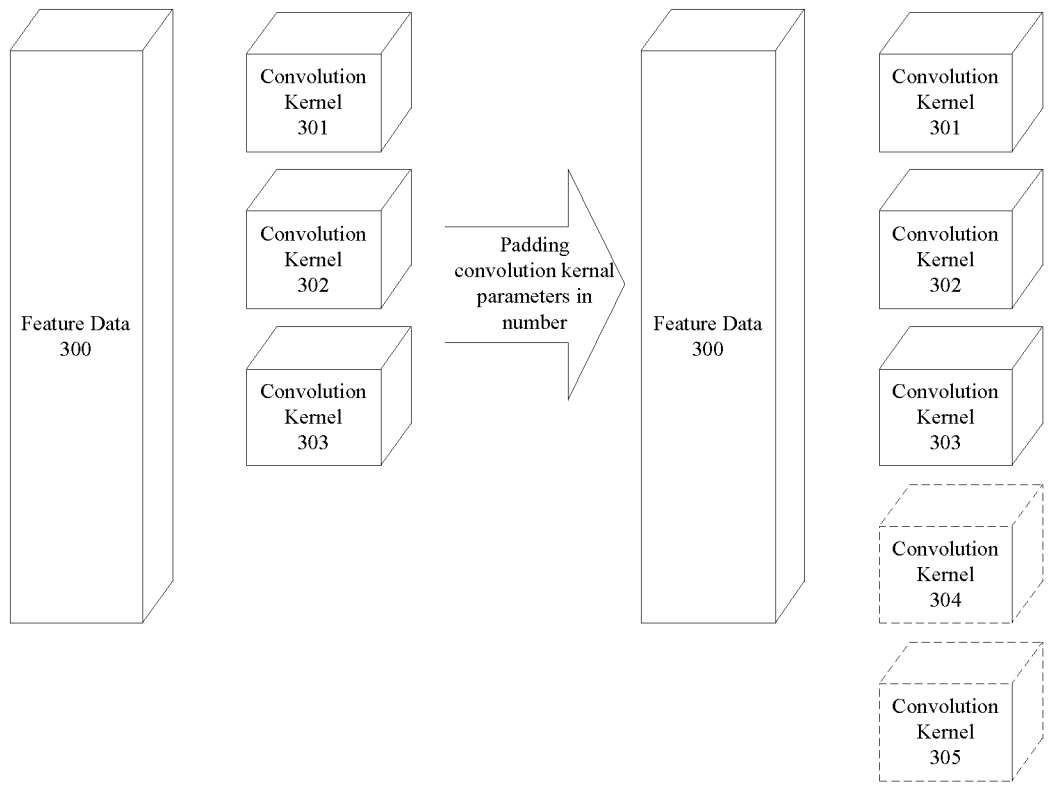
FIG. 3 shows an example of padding a weight parameter in a dimension of number according to an embodiment of the present disclosure.

FIG. 3 shows an example of padding the weight parameter in the convolutional neural network in a dimension of number by using the method according to an embodiment of the present disclosure.

In the example as shown in FIG. 3, based on the design architecture (e.g., predefined by the algorithm designers of the neural network based on specific applications and targets) of the neural network, three convolution kernels are predetermined for the feature data 300 of a layer, i.e. a convolution kernel 301, a convolution kernel 302, and a convolution kernel 303. Accordingly, in the example as shown in FIG. 3, the dimension value of the weight parameter in the dimension of number is 3.

For example, it is determined based on the parameters of the hardware supporting the computations of the neural network that, in a case of designing 5 convolution kernels, the cost and performance in terms of software and/or hardware are relatively good, for example, the design of the selection/enabling circuit of the adder may be omitted, or a relatively good parallel processing may be achieved, or the best or a relatively good processing performance (e.g. parallelism) can be achieved by the hardware in a case of determining to carry out a pooling in the next layer and where the number of channels of the feature data of the corresponding pooling layer is 5. Accordingly, the target value of the weight parameter in the dimension of number may be determined as 5.

Since the dimension value of the weight parameter in the dimension of number (i.e. 3) is less than the corresponding target value (i.e. 5), the weight parameter may be padded in number.

In the example of FIG. 3, two convolution kernels with the same size and shape (i.e., completely the same in width, height, and depth, respectively) as each of the convolution kernels 301 to 303, i.e., convolution kernel 304 and convolution kernel 305 (represented by dashed lines in FIG. 3), may be added on the basis of the convolution kernel 301, the convolution kernel 302, and the convolution kernel 303, such that the total number of convolution kernels after padding is 5 which is the same as the determined target value.

In an example, the convolution kernel 304 and the convolution kernel 305 for padding may be the same. In other words, one or more the same convolution kernels may be used for padding in the dimension of number. In another example, one or more convolution kernels containing different values may also be selected as required for padding in the dimension of number, and all the selected convolution kernels (e.g., the convolution kernel 304 and the convolution kernel 305 in FIG. 3) for padding may have the same shape and size as the originally configured convolution kernels (e.g., convolution kernels 301, 302, and 303 in FIG. 3), i.e., all the convolution kernels (including convolution kernels 301 to 305 in FIG. 3) have at least the same width, the same height, and the same depth.

In an example, the convolution kernel 304 and the convolution kernel 305 for padding may both be a convolution kernel corresponding to a zero value, i.e., each component value contained in convolution kernels 304 and 305 is zero. In another example, the convolution kernel 304 and the convolution kernel 305 may also be selected from a predefined (e.g., by the designer at the design stage of the neural network) set of template data (which may include zero and/or non-zero values), or may also be generated based on a predefined generation rule for a convolution kernel for padding, for example, generated by using one or more predefined numerical values (which may be non-zero values).

In the example as shown in FIG. 3, the convolution kernel 304 and the convolution kernel 305 are padded below the convolution kernel 303, in other words, the convolution kernel 304 and the convolution kernel 305 are sequentially padded to the tail of the ordered sequence including the convolution kernel 301, the convolution kernel 302, and the convolution kernel 303. In another example, one or more another padding positions may be selected as needed. For example, the convolution kernel 304 and the convolution kernel 305 may be padded to the head of an ordered sequence which includes convolution kernel 301, convolution kernel 302, and convolution kernel 303; also, the convolution kernel 304 may be padded to the head of the sequence (i.e., above the convolution kernel 301 in the example of FIG. 3) and the convolution kernel 305 may be padded between the convolution kernel 302 and the convolution kernel 303; or, the convolution kernel 304 may also be padded between the convolution kernel 301 and the convolution kernel 302, and the convolution kernel 305 may be padded between the convolution kernel 302 and the convolution kernel 303; or, the convolution kernel 304 and the convolution kernel 305 may both be padded between the convolution kernel 301 and the convolution kernel 302.

As described above, the padding positions in the dimension of number, the padding amounts, and the rules for setting padding values and so on may be determined based on a default or a determined padding mode.

Figure 4:
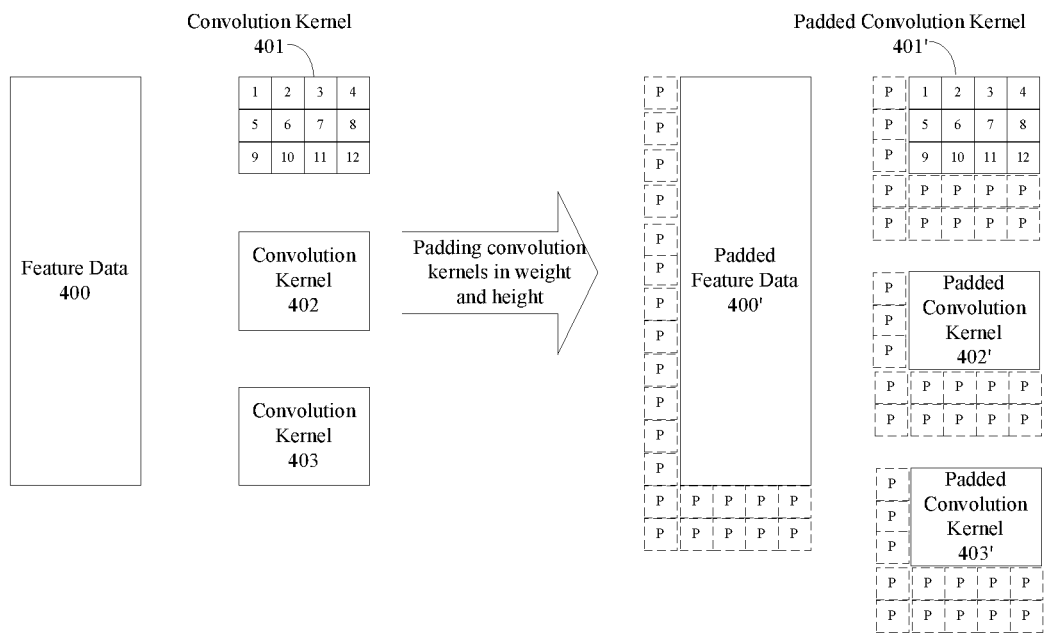
FIG. 4 shows an example of padding a weight parameter in a dimension of width and/or height according to an embodiment of the present disclosure.

FIG. 4 shows an example of padding a weight parameter of a layer in a convolutional neural network in two dimensions of width and height by using the method according to an embodiment of the present disclosure. In FIG. 4, the numbers such as 1, 2, . . . , 12 in each convolution kernel are only for illustrating relative positions of the numerical values (or weight values) in the convolution kernel, but do not represent actual values. For clarity, the depth (or channels) of convolution and feature data is not shown in FIG. 4.

In the example shown in FIG. 4, for example, based on the design architecture of the neural network, the width and height of each convolution kernel (e.g., a convolution core 401, a convolution core 402, and a convolution core 403 in FIG. 4) predetermined for the feature data 400 are 4 and 3, respectively.

For example, based on the parameters of the hardware supporting the computations of the neural network, it is determined that the width and height of the convolution kernel which can be processed directly by the hardware (e.g., dedicated accelerators for the neural network) may be 5 and 5, respectively. Accordingly, the target values of the weight parameter in width and height may be determined as 5 and 5, respectively.

Since the dimension values of the weight parameter in the dimensions of both width and height are less than the corresponding target values, respectively, the weight parameter may be padded in the dimensions of both width and height.

In the example shown in FIG. 4, for each of the convolution kernels 401, 402, and 403, one column is padded on the left side and two rows are padded on the bottom side (the padded rows and columns being represented with P in FIG. 4), such that the width and height of each of the convolution kernels 401', 402' and 403' obtained after padding are 5 and 5, respectively, which are the same as the determined corresponding target value.

In an example, padding may be performed firstly in width, i.e., padding one column on the left side to obtain an intermediate result with width and height of 5 and 3, respectively; then, the intermediate result with width and heights of 5 and 3, respectively, are padded in height, i.e., padding two rows on the bottom side, so as to obtain a final padded convolution kernels with width and height of 5 and 5, respectively. In another example, padding may be performed firstly in height and then in width. In another example, padding may also be performed in both width and height simultaneously.

In a case of padding the weight parameter in width and/or height, the shape of the weight parameter (each convolution kernel) changes. Accordingly, for the corresponding feature data 400, corresponding padding may be performed in width and/or height, such that the padded feature data 400' can match the padded convolution kernels 401', 402' and 403' so as to ensure that a final result which can be obtained by the neural network in a case of using the padded feature data 400' and the padded convolution kernels 401', 402' and 403' is the same as a final result which can be obtained in a case of using the original feature data 400 and the original convolution kernels 401, 402 and 403. In the example shown in FIG. 4, for each of the convolution kernels 401, 402, and 403, one column is padded on the left side and two rows are padded on the bottom side. Accordingly, for the feature data 400, one column may be padded on its left side, and two rows on its bottom side, through which the padded convolution kernels 401', 402' and 403' and the padded feature data 400' are obtained.

Figures 5, 6:
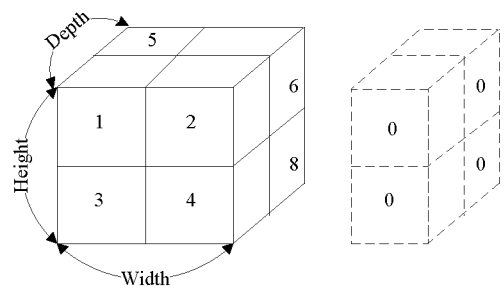
FIG. 5 shows an example of padding a weight parameter in a dimension of width and/or height according to an embodiment of the present disclosure.
FIG. 6 shows an example of padding a weight parameter in a dimension of width and/or height according to an embodiment of the present disclosure.

In an example, the convolution kernel and the feature data may be padded in width and height by using zero values. For example, in the example shown in FIG. 4, the padding values at each padding position P of each convolution kernel and the feature data may be zero values. In another example, the feature data may also be padded by using one or more non-zero values, or by copying values at locations adjacent to the locations to be padded (e.g., the left-most column and the bottom-most row of the feature data 400 in FIG. 4). FIG. 5 shows an example of the padded feature data 500' obtained for example by copying from the feature data 400 in FIG. 4, wherein the padding bits A, B, C, D, and E represent that the values at positions A, B, C, D, and E in the feature data 400 are used as padding values, respectively. In another example, the convolution kernels may also be padded by using other values (e.g., random values or arbitrary values).

In the examples shown in FIG. 4 and FIG. 5, padding is performed on the left and bottom sides of each convolution kernel and/or feature data. In another example, the right bottom sides of the convolution kernel and/or the feature data may also be selected for padding, or padding is performed on the left or right side and the upper side of the convolution kernel and/or the feature data, or one column may be padded on the left or right side of the convolution kernel and/or the feature data and one row is padded on each of the upper and lower sides of the convolution kernel and/or the feature data. In an example, the padding manner for the convolution kernels may be the same as the padding manner for the feature data. For example, in a case where one column is padded on the right side and one row is padded on each of the upper and bottom sides for the convolution kernel, one column is also padded on the right side and one row is also padded on each of the upper and bottom sides for the feature data.

As described above, the padding positions in the dimension of width and/or height, the padding amounts, and the rules for setting padding values and so on may be determined based on the default or determined padding mode, and the padding positions and the padding amounts in the dimension of width and/or height for the feature data may be the same as the padding positions and the padding amounts in the corresponding dimension for the weight parameter, respectively.

For clarity, the depth (channel) of the convolution and/or the feature data is not shown in FIG. 4 and FIG. 5. In fact, the examples of FIG. 4 and FIG. 5 may also be considered as examples of padding in each channel (or depth) for the weight parameter and/or the feature data. In a case of considering the depth, all the channels (or depths) of the weight parameter and/or the feature data may be padded at the same positions according to the same rules for setting padding values and with the same padding amounts. FIG. 6 shows an example of padding one column on the right side of an example convolution kernel with each of width, height, and depth being 2, so as to make it to become a convolution kernel with width, height, and depth being 3, 2, and 2, respectively.

Although FIG. 4 and FIG. 5 show padding the weight parameter and the feature data in the dimensions of both width and height simultaneously, as shown in FIG. 6, the weight parameter and the feature data may also be padded in one dimension of width and height, according to the shape and size of the convolution kernel and the comparison result between the corresponding target values in width and/or height.

Figure 7:
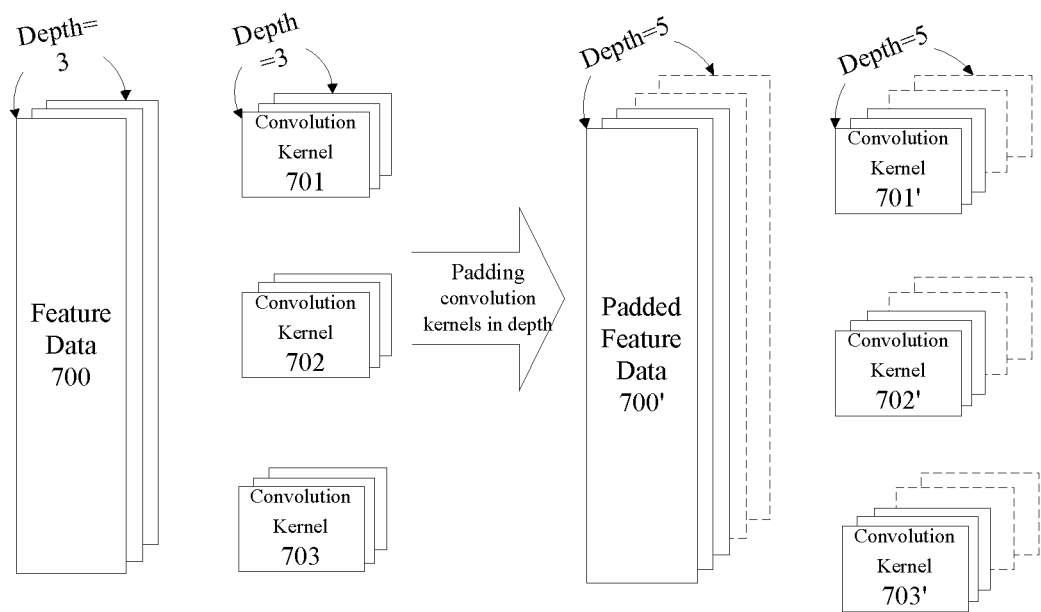
FIG. 7 shows an example of padding a weight parameter in a dimension of depth according to an embodiment of the present disclosure.

FIG. 7 shows an example of padding a weight parameter of a layer in a convolutional neural network in depth (channel) by using the method according to an embodiment of the present disclosure.

In the example shown in FIG. 7, based on the design architecture of the neural network, several convolution kernels 701, 702, and 703 with depth (or number of channels) being 3 are predetermined for the feature data 700 of a layer of the neural network with the number of channels (or depth) being 3.

For example, based on the parameters of the hardware supporting the computations of the neural network, it is determined that in a case of designing convolution kernels with depth being for example 5, the cost and performance in terms of hardware are relatively good, for example, the design of the selection/enabling circuits of the adders may be omitted, or a relatively good parallel processing may be achieved, or the processing may be performed directly by hardware. Accordingly, the target value of the weight parameter in a dimension of depth may be determined as 5.

Since the dimension value of the weight parameter in depth is smaller than the corresponding target value, the convolution kernels may be padded in depth.

As shown in FIG. 7, for each of the convolution kernels 701, 702, and 703, two banks are padded (represented by the dashed lines in FIG. 7), such that the depth of each of the convolution kernels 701', 702' and 703' obtained after padding is 5, which is the same as the determined corresponding target value.

In a case where the weight parameter is padded in depth, the shapes of the convolution kernels 701, 702 and 703 change. Accordingly, the feature data 700 of the layer may be padded in depth, such that the padded feature data 700' can match the padded convolution kernels 701', 702' and 703', so as to ensure that a final result which can be obtained by the neural network in a case of using the padded feature data 700' and the padded convolution kernels 701', 702' and 703' is the same as a final result which can be obtained in the case of using the original feature data 700 and the original convolution kernels 701, 702 and 703. In the example shown in FIG. 7, for each of the convolution kernels 701, 702, and 703, two banks are padded to the rear (each padded convolution kernel having the same width and height in each depth), and accordingly, two banks may be padded to the rear of the feature data 700 (the padded feature data 700' having the same width and height in each depth), through which the padded convolution kernels 701', 702' and 703' and the padded feature data 700' are obtained.

In an example, the convolution kernel may be padded in depth by using zero values. For example, all the data in the two banks that are padded in the rear of each of convolution kernels 701', 702', and 703' in FIG. 7 may be zero. In another example, the convolution kernels may also be padded in depth by using other values as needed. Similarly, the feature data may be padded in depth by using zero values or other values.

In the example of FIG. 7, padding is performed on the rear side of each convolution kernel and the feature data. In another example, padding two banks on the front side may also be selected, or two banks may be padded between two consecutive channels, or one bank may be padded between channel 1 and channel 2 and one bank is padded between channel 2 and channel 3, or one bank may be padded between any two consecutive channels and one bank is padded on the front or rear side. In an example, the padding manner for the convolution kernels may be the same as the padding manner for the feature data. For example, in a case where one bank is padded on front side and one bank is padded between channel 2 and channel 3 for the convolution kernels, one bank is also padded on the front side and one bank is padded between channel 2 and channel 3 for the feature data.

As described above, the padding positions in the dimension of depth, the padding amounts, and the rules for setting padding values and so on may be determined based on the default or the determined padding mode, and the padding positions and the padding amounts in the dimension of depth for the feature data may be the same as the padding positions and the padding amounts in the corresponding dimension for the weight parameter, respectively. In addition, the padding values for padding the feature data may be determined according to the padding value for padding the weight parameter, or may be determined independently.

FIG. 3 to FIG. 7 show the examples of padding the weight parameter and/or the feature data in the dimensions such as number, width, height, and depth by using the method according to an embodiment of the present disclosure. Although of the feature data and the weight parameter may be represented differently in FIG. 2 to FIG. 7, it does not mean that the actual forms of these feature data and/or weight parameter must be different. It is to be appreciated that adopting different forms to represent the feature data and/or the weight parameter is only for convenience and/or emphasis.

It should also be understood that the method according to the embodiments of the present disclosure is not limited to the examples shown in FIG. 3 to FIG. 7, for the weight parameter and feature data of a layer in the convolutional neural network or other types of neural networks, one or more dimensions actually possessed by the weight parameter and/or feature data may be considered as needed, or may be observed equivalently from one or more dimensions, and be padded by using the method according to the embodiments of the present disclosure as needed, so as to obtain a weight parameter and/or feature data with a regular form. For example, for a pooling layer which may exist in the convolutional neural network, for example, a pooling kernel (also called as a receptive field) may be provided for the feature data, and each channel of the feature data is pooled respectively by using the pooling kernel(s). Accordingly, the pooling kernel may be considered as having a dimension of depth, and its depth value is equal to the number of channels (or depth value) of the feature data, and the pooling kernel and/or feature data of the pooling layer may be padded, for example, in depth as needed, for example, be padded in a manner of duplicating the pooling kernel and/or feature data in depth.

Through padding the weight parameter and/or feature data by using the method according to the embodiments of the present disclosure, a weight parameter and/or the feature data with a regular form can be obtained, through which the architecture design of the neural network and the design of the hardware supporting the operations of the neural network (for example, dedicated accelerators, multiply-add units, etc.) can be simplified, the extra processing required to deal with different forms of the weight parameter and the errors that may be produced can be avoid, and the processing performance of software and/or hardware can be improved (for example, the parallelism in processing or the utilization of hardware etc. is improved).

The method according to the embodiments of the present disclosure (for example, the exemplary method 100 shown in FIG. 1) may be used for preprocessing the feature data and the weight parameters of one or more layers in the neural network. For example, the feature data and the weight parameters in one or more layers in the neural network may be checked and padded by using the method according to the embodiments of the present disclosure before the data and instructions are submitted to a hardware layer by a compiler layer in the neural network architecture. The feature data and weight parameter of each of one or more layers in the neural network may also be checked and padded by using the method according to the embodiments of the present disclosure before the operations of the layer.

Although the principle of the method of the present disclosure for adapting the parameters of a neural network has been described above by taking the convolution neural network as an example, it should be understood that the principle of the present disclosure may be applied to other types of neural networks. For example, in a case where the weight parameter is one or more single-valued data, the weight parameter may be padded in number by using, for example, the exemplary method 100 shown in FIG. 1, and by referring to the example shown in FIG. 3, for example. For example, in a case where the weight parameter is one or more two-dimensional data, the weight parameter may be padded in two dimensions of the two-dimensional data by using, for example, the exemplary method 100 shown in FIG. 1, and by referring to the example shown in FIG. 4 and FIG. 5, for example. Accordingly, how to determine the target values and perform padding for the weight parameter in corresponding dimensions may be determined according to the requirement and the type of the neural network.

Figure 8:
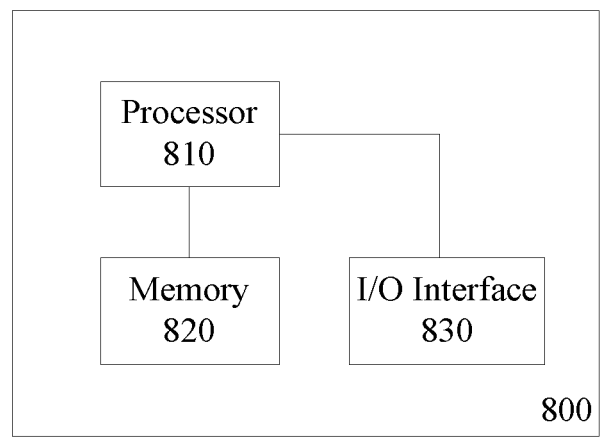
FIG. 8 shows a block diagram of an exemplary apparatus for adapting parameters of a neural network in accordance with an embodiment of the present disclosure.

FIG. 8 shows a block diagram of an apparatus for adapting parameters of a neural network in accordance with an embodiment of the present disclosure.

As shown in FIG. 8, the exemplary apparatus 800 may include one or more processors 810. The processor 810 may be a processing unit in any form that is able to process data and/or execute instructions, such as a common CPU, a GPU, or dedicated a processor or accelerator for a neural network. For example, the processor 810 may perform the method for adapting parameters of the neural network according to the embodiments of the present disclosure. In addition, the processor 810 may also control other components in the apparatus 800 to perform desired functions.

The processor 810 may be connected to a memory 820 and an I/O interface 830 through a bus system and/or a connection mechanism in other forms (not shown).

The memory 820 may include a computer readable and writable storage medium in various forms, for example, a volatile memory and/or a non-volatile memory. The volatile memory may include, for example, a random access memory (RAM) and/or a cache, etc. The non-volatile memory may include, for example, a read only memory (ROM), a hard disk, a flash memory, etc. The readable and writable storage medium may include, but are not limited to, an electric, a magnetic, an optical, an electromagnetic, an infrared, or a semiconductor system, apparatus, or device or any combination of the above. For example, in a case of being used combining with a neural network dedicated processor, the memory 820 may also be a RAM on a chip carrying a dedicated processor. The memory 820 may include program instructions for instructing the device 800 to perform the method for adapting the parameters of the neural network according to the embodiments of the present disclosure.

The I/O interface 830 may be configured to provide parameters or data to the processor 810 and outputting the result data processed by the processor 810.

Figure 9:
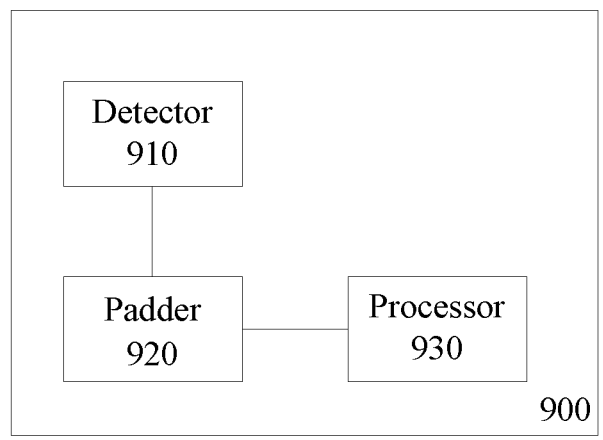
FIG. 9 shows a block diagram of an exemplary apparatus for adapting parameters of a neural network in accordance with an embodiment of the present disclosure.

FIG. 9 shows a block diagram of an apparatus for adapting parameters of a neural network according to another embodiment of the present disclosure.

As shown in FIG. 9, the exemplary apparatus 900 may include a detector 910 and a padder 920. The detector 910 may be configured to determine a dimension value and a corresponding target value of the weight parameter of each of at least one layer of the neural network in each of one or more dimensions selected for the weight parameter. The padder 920 may be configured to pad the weight parameter in a case where the dimension value in at least one dimension of the weight parameter is less than the corresponding target value, such that the dimension value in each dimension of the weight parameter obtained after the padding is equal to the corresponding target value.

The exemplary apparatus 900 may also include a processor 930 (e.g., a common CPU, a GPU, or a dedicated processor or accelerator for a neural network) for receiving the output data from the padder 920 and performing the operations related to the neural network.

It should be understood that the apparatus 800 and apparatus 900 shown in FIG. 8 and FIG. 9 are only exemplary but not limiting. The apparatus according to the embodiment of the present disclosure, which may be used to adapt parameters of a neural network, may have other components and/or structure as needed.

Unless otherwise required clearly in the context, throughout the description and claims, the wordings such as "comprise" and "include" are to be construed in an inclusive sense, as opposed to an exclusive or exhaustive sense, that is to say, in a sense of "including but not limited to". Additionally, when used in the disclosure, the wordings of "herein", "above", "below" and similar wordings shall refer to the disclosure as a whole but not to any specific portion of the disclosure. When being permitted in the context, the wordings in singular or plural used in the above descriptions may also include the plural or singular, respectively. The wording of "or" in reference to a list of two or more items covers all of the following interpretations of the wording:

any of the items in the list, all of the items in the list, and any combination of the items in the list.

The above detailed description of the embodiments of the disclosure is not intended to be exhaustive or to limit the disclosure to a specific form disclosed above. Although specific embodiments and examples of the disclosure are described above for illustrative purposes, various equivalent modifications are possible within the scope of the disclosure, as appreciated by those skilled in the art. For example, although the processes or blocks are presented in a given order, alternative embodiments may execute a process including these steps in a different order or employ a system including these blocks in a different order, and some processes or blocks may be deleted, moved, added, subdivided, combined, and/or modified. Each of these processes or blocks may be implemented in a variety of different ways. Further, although the processes or blocks are shown sometimes as being executed in series, these processes or blocks may instead be executed in parallel, or may be executed at different times.

The teachings of the disclosure provided herein may be applied to other systems, but not necessarily the system described above. The elements and acts of the various embodiments described above may be combined to provide further embodiments.

Although some embodiments of the disclosure have been described, these embodiments have been presented by way of example only, but are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure.

What is claimed is:

1. A method for adapting parameters of a neural network, comprising:
   selecting one or more dimensions for a weight parameter of each of at least one layer of the neural network;
   determining a dimension value in each of the one or more dimensions for the weight parameter;
   determining a corresponding target value in each dimension for the weight parameter based on parameters of a hardware supporting computations of the neural network;
   and padding the weight parameter in at least one dimension of the one or more dimensions where the dimension value in the at least one dimension of the weight parameter is less than the corresponding target value, the dimension value in each of the one or more dimensions of the weight parameter obtained after the padding being equal to the corresponding target value, thereby obtaining a weight parameter and/or the feature data with a regular form, and then obtaining a neural network and/or a convolution kernel applying to the hardware supporting computations of the neural network;
   wherein the step of determining the target value in each dimension for the weight parameter includes:
      determining a set of candidate values for the target value in each dimension based on a utilization ratio of the hardware supporting computations of the neural network; and
      determining the corresponding target value in each dimension based on one or more of a shape or a number of the weight parameter processed by the hardware supporting computations of the neural network, wherein the corresponding target value in each dimension is a minimum of the weight parameter, being equal to or greater than the corresponding dimension value in each dimension, in the set of candidate values for the target value in each dimension.

2. The method of claim 1 wherein the one or more dimensions comprise at least one of width, height, depth, and number.

3. The method of claim 1 wherein the one or more dimensions comprise a first dimension, the corresponding target value in the first dimension of the weight parameter being determined based on a subset of a set of candidate values associated with the first dimension, and each candidate value in the subset being greater than or equal to the dimension value in the first dimension of the weight parameter.

4. The method of claim 3 wherein the corresponding target value in the first dimension of the weight parameter is a minimum candidate value in the subset.

5. The method of claim 3 wherein the first dimension comprises depth or number and the set of candidate values comprises one or more common multiples of a first parameter and a second parameter, the first parameter and the second parameter being predetermined based on hardware parameters of a hardware supporting computations of the neural network.

6. The method of claim 1 wherein the one or more dimensions comprise a first dimension and at least one second dimension, the corresponding target values in the first dimension and the at least one second dimension of the weight parameter being determined based on a subset of a set of candidate value arrays, each of the candidate value arrays in the set of candidate value arrays comprising a first candidate value corresponding to the first dimension and at least one second candidate value corresponding respectively to the at least one second dimension, and each candidate value in each candidate value array in the subset being greater than or equal to the dimension value in a corresponding dimension of the weight parameter, respectively.

7. The method of claim 6 wherein the corresponding target value in the first dimension of the weight parameter is a minimum first candidate value determined based on the subset.

8. The method of claim 6 wherein the corresponding target values in the first dimension and the at least one second dimension of the weight parameter are corresponding candidate values in a first candidate value array in the subset, respectively, a product of all candidate values in the first candidate value array being less than a product of all candidate values in any other candidate value array in the subset.

9. The method of claim 6 wherein the first dimension comprises width or height or depth, and the set comprises one or more corresponding candidate value arrays for each combination of corresponding target values in the first dimension and the at least one second dimension of the weight parameter, each combination being predetermined based on hardware parameters of a hardware supporting computations of the neural network.

10. The method of claim 1, further comprising:
   for each dimension of the at least one dimension, determining a padding mode corresponding to the dimension, the padding mode indicating at least one of one or more padding positions, padding amounts, and rules for setting padding values for padding the weight parameter in the dimension.

11. The method of claim 10 wherein the one or more dimensions comprise at least one of width, height, depth, and number,
- an information indicated by the padding mode corresponding to width comprises padding one or more columns at one or more positions on left side and/or on right side and/or in middle in a direction of width,
- an information indicated by the padding mode corresponding to height comprises padding one or more rows at one or more positions on top side and/or on bottom side and/or in middle in a direction of height,
- an information indicated by the padding mode corresponding to depth comprises padding one or more banks at one or more positions on front side and/or on rear side and/or in middle in a direction of depth, and
- an information indicated by the padding mode corresponding to number includes padding one or more padding values at one or more positions before and/or after and/or in a sequence of the weight parameter.

12. The method of claim 10 wherein the rules for setting the padding values comprise at least one of padding by using a zero value, padding by using one or more predefined non-zero values, and padding by using values in the weight parameter at positions adjacent to positions to be padded.

13. The method of claim 1, further comprising:
padding, in corresponding width and/or height and/or depth, a feature data of a layer to which the weight parameter belongs, in a case where the at least one dimension comprises width and/or height and/or depth.

14. The method of claim 13 wherein padding positions and padding amounts in each dimension to be padded for the feature data are the same as padding positions and padding amounts in a corresponding dimension for the weight parameter, respectively.

15. The method of claim 13 wherein the feature data is padded by using at least one of a zero value, one or more predefined non-zero values, values in the feature data at positions adjacent to positions to be padded, and random values.

16. The method of claim 1, wherein the neural network is a convolutional neural network.

17. An apparatus for adapting parameters of a neural network, comprising:
one or more processors configured to perform the method of claim 1.

18. A computer-readable non-transitory storage medium having program instructions stored thereon executed by a processor for performing the method of claim 1.

* * * * *